United States Patent [19]

Behle

[11] 4,114,636

[45] Sep. 19, 1978

[54] BOTTOM OPERABLE AIR INLET AND OUTLET VALVE

[75] Inventor: Gunter R. Behle, St. Charles, Mo.

[73] Assignee: ACF Industries, Incorporated, New York, N.Y.

[21] Appl. No.: 728,343

[22] Filed: Sep. 30, 1976

[51] Int. Cl.² ............................................. F16K 17/36
[52] U.S. Cl. ...................................... 137/43; 137/587
[58] Field of Search ............... 251/144; 137/587, 588, 137/589, 591, 43, 267, 202, 205, 171

[56] References Cited

U.S. PATENT DOCUMENTS

| 1,053,344 | 2/1913 | Asbury | 137/625.18 X |
|---|---|---|---|
| 1,587,864 | 6/1926 | Sargent | 137/205 |
| 1,662,614 | 3/1928 | Mandolini | 137/588 |
| 1,699,527 | 1/1929 | Folmsbee | 251/144 X |
| 2,104,461 | 1/1938 | Holm | 137/43 X |
| 2,460,159 | 1/1949 | White | 137/589 X |
| 2,510,098 | 6/1950 | Geisler | 137/43 |
| 2,528,600 | 11/1950 | Lombard | 137/43 |
| 2,646,817 | 7/1953 | Cox et al. | 137/267 X |
| 2,664,911 | 1/1954 | Thompson et al. | 137/205 |
| 2,751,755 | 6/1956 | Fowler | 137/577 X |
| 3,661,355 | 5/1972 | Rawstron | 251/144 |
| 3,675,679 | 7/1972 | Schwartz, Jr. | 137/587 |

*Primary Examiner*—William R. Cline
*Attorney, Agent, or Firm*—Henry W. Cummings

[57] ABSTRACT

An air inlet and outlet valve is located in the bottom of a tank so that the operator need not climb to the top of the tank to operate the valve. A conduit extends from the valve to the top of the tank. A stilling well is mounted inside the top of the tank. A ball which is lighter than the lading is mounted in the stilling well. The stilling well includes openings allowing air to enter or leave the tank through the conduit when the ball is in an unseated position in the stilling well. Lading contacting the ball moves the ball into a seated position which blocks the entrance to the conduit and prevents lading from entering the conduit, going down through the conduit to the valve at the bottom of the tank, and discharging from the conduit when the operator opens the valve.

8 Claims, 8 Drawing Figures

BOTTOM OPERABLE AIR INLET AND OUTLET VALVE

BACKGROUND OF THE INVENTION

In U.S. Pat. No. 3,981,481 assigned to the same assignee as the present application, a bottom operable tank car lading valve is disclosed. Other bottom operable tank car valves are disclosed in U.S. Pat. Nos. 3,227,101; 3,591,131; 3,661,355; 3,721,424. These bottom operable tank car lading valves allow the operator to operate the lading valve for loading or unloading the car without going on top of the car. Thus the danger of the operator falling off the car while operating the outlet valve is avoided when such a bottom operable lading valve is utilized.

However to load and unload a tank car it is necessary to provide a valve to allow air to enter the car during unloading, and air to leave the car while the car is being loaded. In the past such air inlet and air outlet valves have been located on top of the car. Thus the operator must climb on top of a car in order to open the prior art air inlet and outlet valves during loading and unloading the car. Thus to improve operator safety it would be desirable to place the air inlet and outlet valve at the bottom of the car.

SUMMARY OF THE INVENTION

An air inlet and air outlet valve is located in the bottom of the tank so that the operator need not climb to the top of the tank to operate the valve. A conduit extends from the valve to the top of the tank. A stilling well mounted inside the tank is in fluid communication with the conduit. A ball which is lighter than the lading is mounted in the stilling well. The stilling well includes openings allowing air to enter or leave the tank through the conduit when the ball is in an unseated position in the stilling well. Lading contacting the ball moves the ball into a seated position in the stilling well which blocks fluid communication between the conduit and the inside of the tank. Thus lading is prevented from entering the conduit, going down to the air inlet and outlet valve at the bottom of the tank, and discharging from the conduit when the operator opens the air inlet and outlet valve. To retrofit existing tanks which have an upper chamber extending above the tank body, the stilling well and ball may be mounted in the upper chamber. To mount the stilling well in tanks not having an upper chamber, the stilling well may be mounted on a support depending from the top of the tank.

THE DRAWINGS

DESCRIPTION OF PREFERRED EMBODIMENTS

Figure 1:
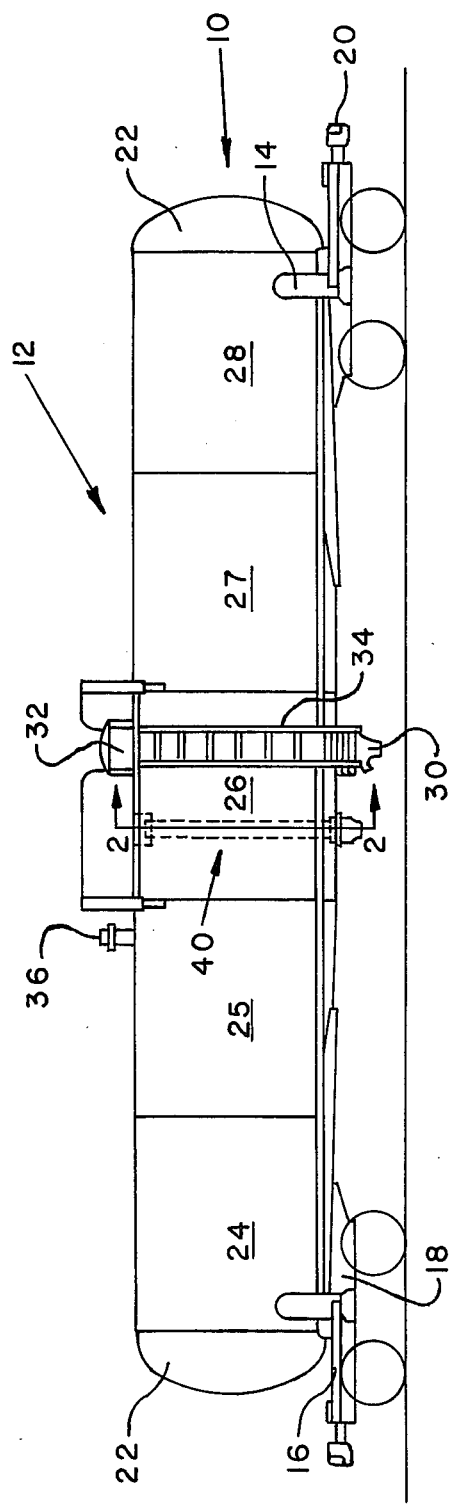
FIG. 1 is a side elevation view of a railway tank car in which the air inlet and outlet valve assembly of the present invention may be mounted.

The air inlet and outlet valve assembly of the present invention may be utilized with an overland tank truck, an intermodal container or container mounted in a ship. However, by way of example, the air inlet and outlet valve assembly of the present invention will be described and illustrated in connection with its application to a railway tank car.

In the drawings, a railway tank car 10 is illustrated in which a tank 12 is mounted upon cradles 14 which are supported by stub sills 16 and trucks 18 at opposite ends of the car. A conventional coupler 20 and a draft gear (not shown) are mounted within the stub sills. The tank includes end portions 22 and tank sections 24, 25, 26, 27, and 28 welded together to form an integal tank.

The tank car may be loaded and/or unloaded through a bottom operated unloading valve 30, for example, according to the teachings of one or more of U.S. Pat. Nos. 3,591,131 or 3,661,355 or 3,721,424 or 3,227,101 or according to the teachings of U.S. Pat No. 3,981,481 assigned to the same assignee as the present application.

Normally an air inlet and outlet valve an vacuum relief valve is provided in an upper chamber 32 (a siphon housing) located on top of the car. A ladder 34 is provided for the operator to climb to the top of the car to operate the air inlet and outlet valve when the tank is loaded or unloaded. During unloading of the car the air inlet valve must be open for air to replace lading which is removed from the tank. During loading the valve must be open to allow air to escape. During unloading usually the vacuum relief valve is inspected to ascertain that it is operating properly.

However the operator being on top of the car constitutes a safety hazard. The operator can slip or trip, falling off the tank and causing injury to himself.

Figure 3:
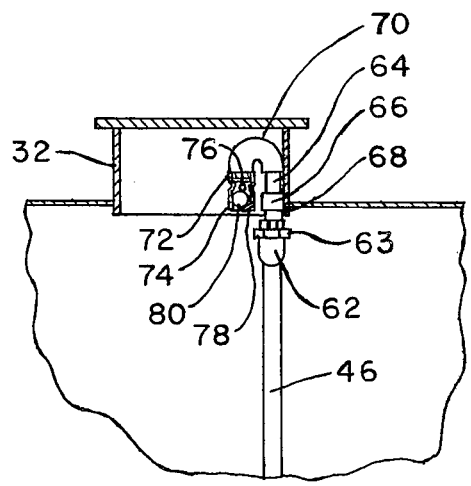
FIG. 3 is a partial sectional view looking in the direction of the arrows along the line 3—3 in FIG. 2.
Figure 2:
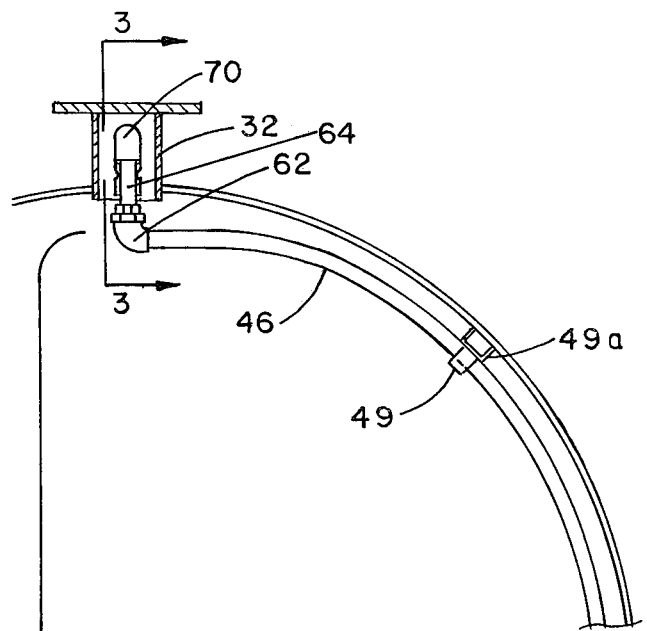
FIG. 2 is a sectional view looking in the direction of the arrows along the line 2—2 in FIG. 1 illustrating the air inlet and outlet valve assembly of the present invention.
Figure 2:
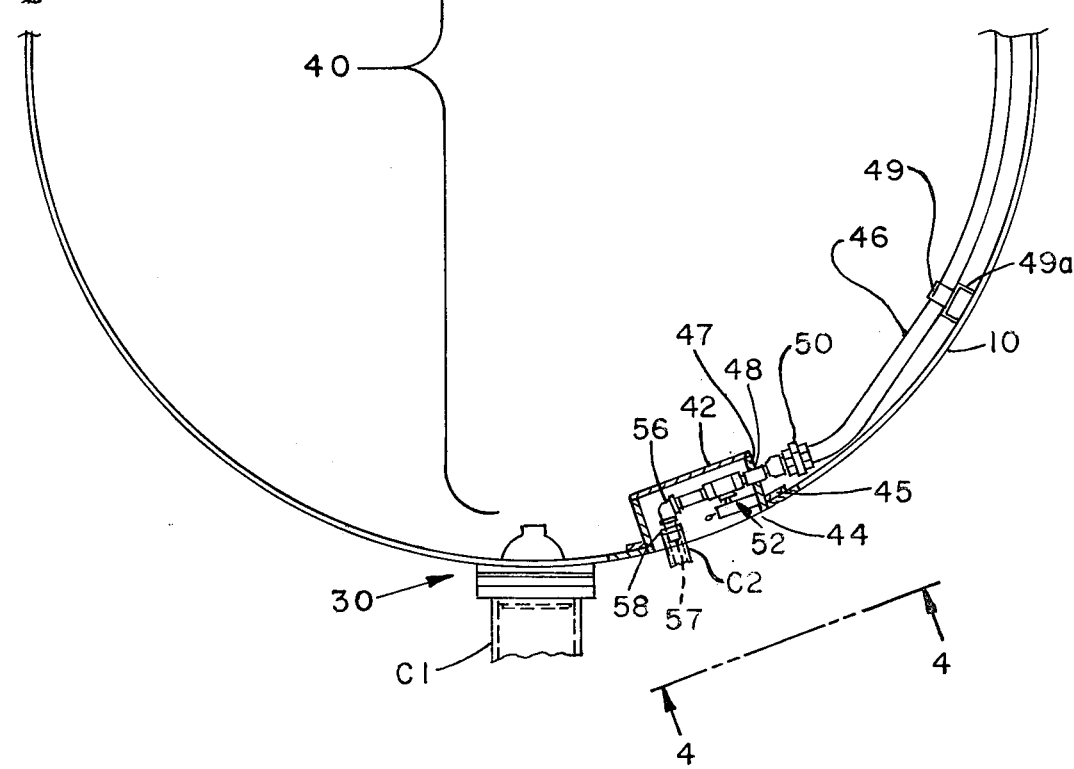
Figure 4:
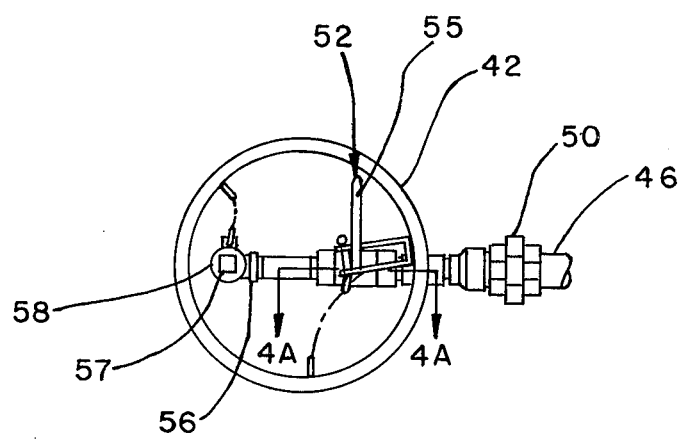
FIG. 4 is a view looking in the direction of the arrows along the line 4—4 in FIG. 2.
Figure 4A:
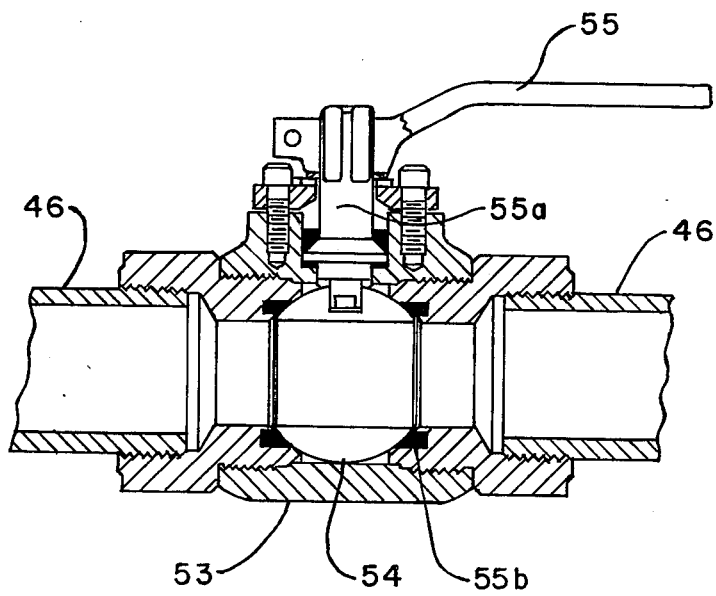
FIG. 4A is a view looking in the direction of the arrows along the line 4A—4A in FIG. 4.

In accordance with the present invention an air inlet and outlet valve assembly 40 is provided which is operable from the bottom of the car. As shown in FIGS. 2-4, this assembly includes a housing 42 attached to an opening 44 in the bottom of tank 10. As shown in FIG. 4, housing 42 is circular in shape. Housing 42 includes a curved circumferential extension 45 to facilitate welding the housing in place within the tank. A conduit 46 extends through an opening 48 in housing wall 47 upwardly along the internal periphery of the tank 10 and is held in place by brackets 49 having bracket supports 49a welded to the tank. Conduit 46 includes a coupling 50 outside of housing 42. Within housing 42 conduit 46 includes a manual operable valve 52 of known construction. For example, a ball valve 53 as shown in FIG. 4A may be used which includes a ball 54 and an operator 55 having a depending rotating portion 55a which engages the ball. In closed position the ball 54 engages a seal 55b. Operation of the ball valve is conventional. However further information concerning the ball valve may be obtained in ACF Industries, WKM Division Catalog No. BG-1, page 5, dated 1976. Conduit 46 includes a 90° bend 56 and a removable plug 57 to allow air to enter during unloading. When plug 57 is removed fitting 58 is adapted to receive a hose or conduit for removing air and lading vapors during loading or unloading to be described to greater detail hereinafter.

For retrofitting existing tanks conduit 46 extends into upper chamber 32 located on top of the tank. Conduit 46 includes a 90° elbow 62, a coupling 63, and a vertically extending portion 64. To maintain conduit portion 64 in place a collar 66 may be welded to the chamber wall 68. A 180° return bend 70 is provided which terminates a stilling well 72.

Stilling well 72 is a generally cylindrical member having an opening at the bottom 74 and circumferentially spaced openings 76 at the top. Radially spaced ribs 78 at the lower portion of the stilling well hold in place a ball 80. Ball 80 is made of material which is lighter than any of the ladings contemplated for transport in the tank. Ball 80 is preferably hollow and may be made of plastic or thin wall metal, such as aluminum alloy or stainless steel. Ball 80 normally is in the position shown in solid lines in FIG. 3 at which position air or other vapor may enter or leave conduit 46 through openings 74 and/or 76. However ball 80 is movable vertically within stilling well 72 under action or lading in the tank contacting the bottom of the ball. The ball can thus assume a seated position shown dotted in FIG. 6A closing off the hollow bottom 74 and openings 76 from communication with conduit 46 (FIG. 3). Thus in the seated dotted position shown in FIG. 6A air and lading are prevented from entering conduit 46 FIG. 3 or conduit 94 in FIG. 6A.

In operation of the bottom operable air inlet and outlet valve, to load the car a conduit $C_1$ is attached to bottom operable valve 30 and valve 30 is opened to allow lading to enter the tank. Plug 57 is removed and for lading having toxic vapors a conduit $C_2$ is attached to fitting 58 to transmit the vapors to a suitable exit point removed from the unloading site (not shown). As lading enters the tank, air and vapors pass upwardly and enter stilling well 72 through the hollow bottom 74 and/or openings 76, and then pass downwardly through conduit 46. The air and/or vapors may directly exit through fitting 58 or through the conduit $C_2$ attached to fitting 58 to remove such vapors from the unloading site. When the tank is filled to the extent desired, the valve 52 is closed with operator 55, conduit $C_1$ is removed from bottom operable valve 30, and conduit $C_2$ (if utilized) is removed from fitting 58 and plug 57 replaced. During unloading of the car, valve 52 is opened to allow air to displace lading being unloaded through lading valve 30. Ball 78 remains in the unseated position shown in FIG. 3.

When the car is impacted in transit or when the car is traveling on an incline lading may come in contact with ball 80. Since the ball is lighter than the lading it will move upwardly and assume the seated position shown in dotted lines in FIG. 6A. In the seated position the ball prevents air and lading from entering the conduit 46 or 94, as the case may be. When the surge is terminated, or the car is no longer traveling on an incline, and the lading assumes its normal position in the tank, the ball will drop to the position shown in solid lines in FIGS. 3 and 6A. Thus when the operator removes plug 57 for loading or unloading, lading will not be in the conduit and lading will not spew out at the operator causing a safety hazard to the operator and/or other personnel at the unloading site.

Since the air inlet and outlet valve is operable from the bottom of the car, the operator need not climb on top of the car to operate the air inlet and outlet valve. Thus the safety hazard of the operator having to climb on top of a car to operate the air inlet and outlet valve is eliminated in accordance with the present invention. Furthermore for cars having a bottom operable loading and unloading valve, it is convenient for the operator to operate the bottom operable valve 30 and the air inlet and outlet at the same time.

Figure 5:
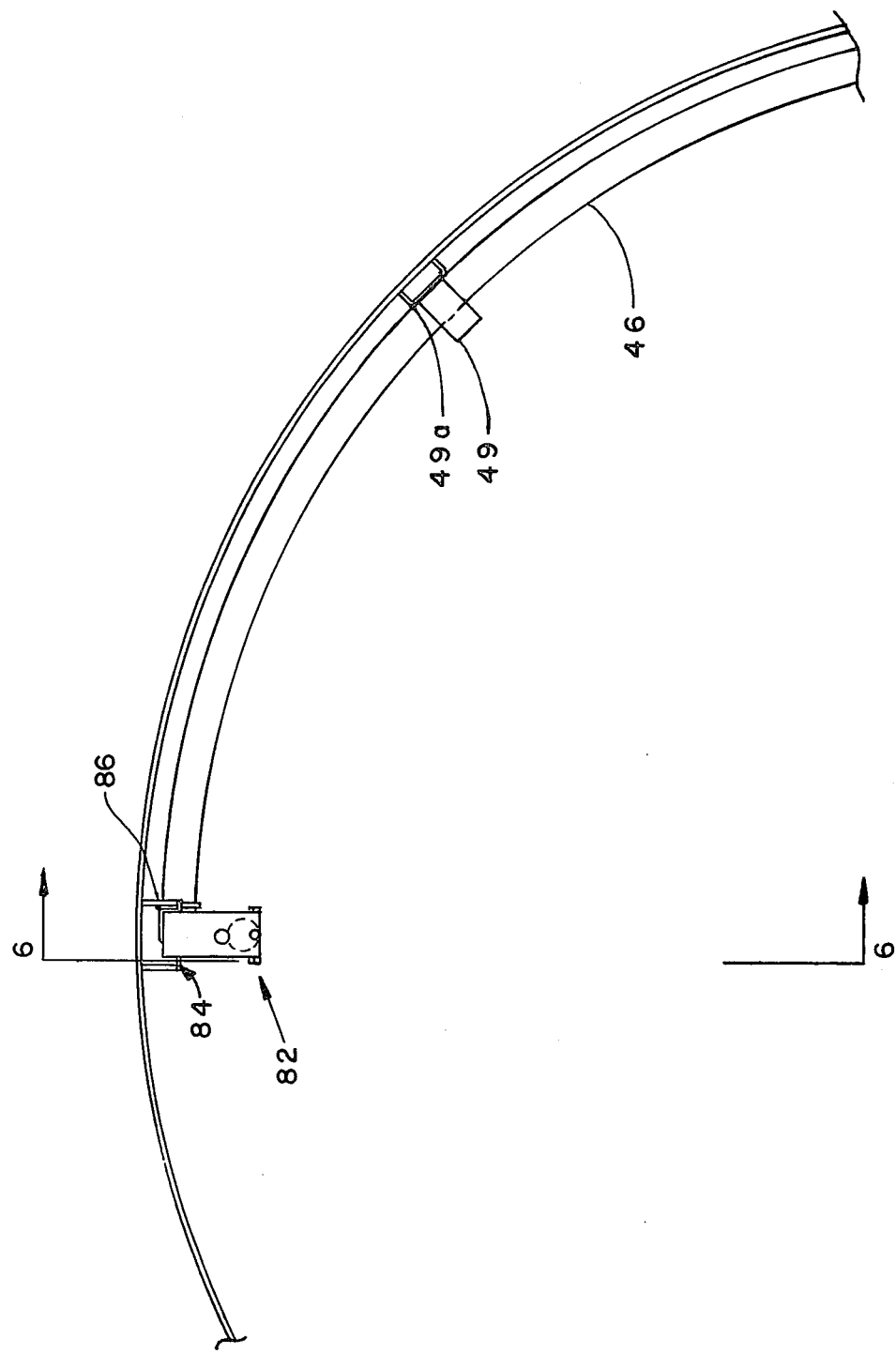
FIG. 5 is a sectional view similar to FIG. 2 of another embodiment of the present invention illustrating mounting the stilling well and ball in a tank not having an upper chamber.
Figure 6:
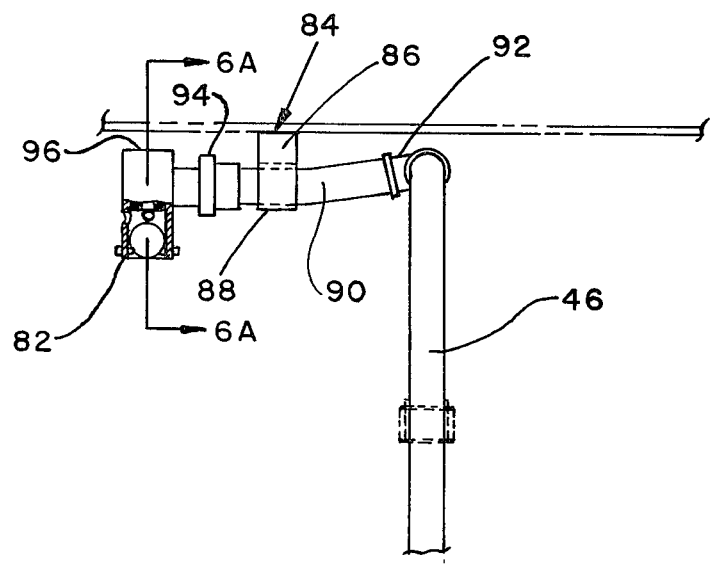
FIG. 6 is a sectional view looking in the direction of the arrows along the line 6—6 in FIG. 5.
Figure 6A:
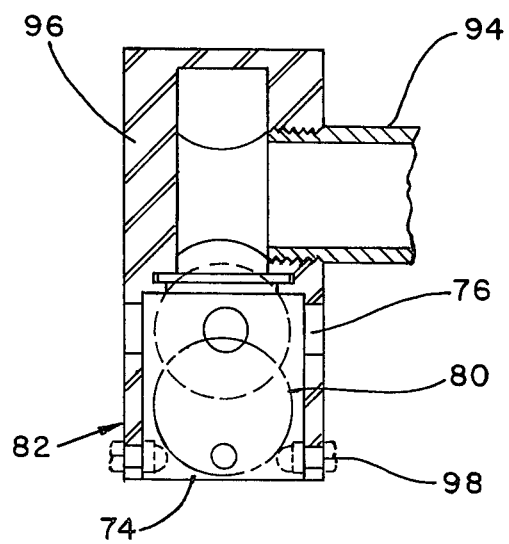
FIG. 6A is a sectional view looking in the direction of the arrows along the line 6A—6A in FIG. 6.

The embodiment as shown in FIGS. 2 and 4 is satisfactory for retrofitting existing tank cars which include an upper chamber 32. However for new tanks the embodiment shown in FIGS. 5 and 6 is preferred. In this embodiment the stilling well 82 which is constructed in the same manner as stilling well 72, is mounted upon a depending support assembly 84 which is attached to the top tank for example by welding. Support assembly 84 includes a pair of depending bracket arms 86 joined by a collar 88 (FIG. 6) which engages a pipe section 90 attached to a 90° elbow 92 which is attached to conduit 46. Pipe section 90 is attached to a coupling 94 which is attached to stilling well dome 96. Ball 80 is held in place with transversely extending fasteners 98. The operation of the ball and stilling well is the same as the embodiment shown in FIGS. 3 and 4.

Any suitable support attached to the top of the tank may be used to support the stilling well, including a non-rigid support such as a chain or cable.

The air inlet and outlet valve 52 instead of a ball valve may comprise for example a gate valve of known construction. See for example Crane company. Catalog NOVC 100A, page 3, 300 Par Avenue, New York, New York 10022 (1972). A plug valve also may be used; see the same catalog page 9, item number 3. Alternatively a discharge valve may be used, see the same catalog page 9, item number 7 and page 15, item number 2.

What is claimed is:

1. A bottom operable air inlet and air outlet valve assembly located in a railway tank car for loading and unloading the car comprising:

a conduit extending within the car between the bottom of the tank and the top of the tank; a conduit bottom opening located in the conduit at the bottom portion of the tank; said conduit having air inlet and outlet valve means located at the bottom portion of the tank for opening and closing said bottom opening; a stilling well mounted inside the top of the tank, in fluid communication with said conduit; a ball made of light material mounted in the stilling well and located above the level in the tank corresponding to the fully loaded position of the lading in the tank; said stilling well including a seat for said ball, and openings allowing air and vapors to leave the tank through said conduit during loading of the tank to the fully loaded position when said ball is in an unseated position; and allowing air to enter said tank through said conduit and said openings during unloading of the tank when said ball is in said unseated position; said ball being movable into a seated position in the stilling well which blocks fluid communication between said conduit and the inside of the tank, under impacts to the tank and when the car is traveling on an incline, and prevents lading from entering the conduit, whereby said seated ball prevents lading going down through the conduit to said air inlet and outlet valve means and discharging from the conduit when the operator opens said air inlet and outlet valve means, and whereby after the impact and/or traveling on an incline, said ball returns to an unseated position adapted for unloading even under full load and whereby it is unnecessary for the operator to climb to the top of the car to open said air inlet and outlet valve.

2. An assembly according to claim 1 wherein an upper chamber extends above the tank body, and said stilling well is mounted in said chamber.

3. An assembly according to claim 2 wherein said conduit extends vertically within said chamber and is held in place with a collar attached to said chamber.

4. An assembly according to claim 1 wherein the stilling well is mounted on a support depending from the top of the tank.

5. An assembly according to claim 4 wherein said depending support is a bracket assembly.

6. An assembly according to claim 1 wherein said ball is hollow.

7. An air inlet valve assembly according to claim 1 wherein said valve means is located in a housing mounted within the tank.

8. A bottom operable outlet valve assembly according to claim 1 including a bottom operable tank car lading valve located in the bottom of the tank, whereby it is unnecessary for the operator to climb to the top of the tank to load or unload the lading.

* * * * *